US010851210B2

(12) United States Patent
Engelbrecht et al.

(10) Patent No.: US 10,851,210 B2
(45) Date of Patent: Dec. 1, 2020

(54) PROCESS FOR PREPARING POLYALKYLENE ETHER-MODIFIED POLYSILOXANES AND USE THEREOF

(71) Applicant: BASF SE, Ludwigshafen am Rhein (DE)

(72) Inventors: Lothar Engelbrecht, Berlin (DE); Wolfgang Peter, Altlussheim (DE); Clemens Auschra, Freiburg (DE); Ralf Knischka, Neustadt (DE); Reiner Kranwetvogel, Hassloch (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/769,103

(22) PCT Filed: Nov. 2, 2016

(86) PCT No.: PCT/EP2016/076330
§ 371 (c)(1),
(2) Date: Apr. 18, 2018

(87) PCT Pub. No.: WO2017/076851
PCT Pub. Date: May 11, 2017

(65) Prior Publication Data
US 2018/0305548 A1    Oct. 25, 2018

(30) Foreign Application Priority Data
Nov. 5, 2015  (EP) ..................................... 15193230

(51) Int. Cl.
*C08G 77/46* (2006.01)
*C08G 77/08* (2006.01)
*C08L 83/12* (2006.01)
*C08G 77/18* (2006.01)
*C09D 183/12* (2006.01)
*C08K 3/014* (2018.01)
*C08K 5/00* (2006.01)

(52) U.S. Cl.
CPC ............. *C08G 77/46* (2013.01); *C08G 77/08* (2013.01); *C08L 83/12* (2013.01); *C08G 77/18* (2013.01); *C08K 3/014* (2018.01); *C08K 5/005* (2013.01); *C09D 183/12* (2013.01)

(58) Field of Classification Search
CPC ................................ C08G 77/08; C08G 77/46
See application file for complete search history.

(56) References Cited

U.S. PATENT DOCUMENTS

| 3,133,111 | A | 5/1964 | Wheeler | |
| 4,408,031 | A * | 10/1983 | Holtschmidt | .......... C08G 77/18 428/447 |
| 4,562,223 | A | 12/1985 | Steinberger et al. | |
| 5,260,402 | A * | 11/1993 | Weitemeyer | .......... C08G 77/38 428/447 |
| 2005/0148710 | A1 | 7/2005 | Dean et al. | |
| 2008/0014166 | A1 | 1/2008 | Klug et al. | |
| 2009/0069457 | A1* | 3/2009 | Brown | .............. C08G 18/4804 521/137 |
| 2013/0060058 | A1 | 3/2013 | Issberner et al. | |

FOREIGN PATENT DOCUMENTS

| DE | 19624550 A1 | 1/1998 |
| DE | 102014105434 A1 | 10/2015 |
| EP | 0542484 A1 | 5/1993 |
| EP | 1739132 A2 | 1/2007 |
| EP | 2360205 A1 | 8/2011 |

OTHER PUBLICATIONS

U.S. Appl. No. 15/768,590, filed Apr. 16, 2018, Lothar Engelbrecht, et al.
International Search Report dated Dec. 12, 2016, in PCT/EP2016/076330, filed Nov. 2, 2016.
Extended European Search Report dated Feb. 9, 2016 in Patent Application No. 15193230.8, (with English translation of Categories of Cited Documents), 4 pages.
Heidrun Steimann, et al., "Umalkoxylierung in der Siliciumorganischen Chemie", Zeitschrift für Chemie, vol. 17, Issue 3, Mar. 1977, pp. 89-92.

* cited by examiner

*Primary Examiner* — Marc S Zimmer
(74) *Attorney, Agent, or Firm* — Oblon, McClelland, Maier & Neustadt, L.L.P.

(57) ABSTRACT

The invention relates to a process for preparing oligo- or polyalkylene ether-modified polysiloxanes by transesterification of alkoxy-functionalized polysiloxanes with OH—terminated oligo- or polyalkylene ethers in the presence of the tetra-n-$C_1$-$C_6$-alkoxy-titanate as catalyst. Oligo- or polyalkylene ether-modified polydimethylsiloxanes obtainable through this process are suitable as defoamers, as wetting agents, and as additives in coating material formulations.

10 Claims, No Drawings

PROCESS FOR PREPARING POLYALKYLENE ETHER-MODIFIED POLYSILOXANES AND USE THEREOF

The present invention relates to a process for preparing oligo- and polyalkylene ether-modified polysiloxanes and to the use of the oligo- or polyalkylene ether-modified polydimethylsiloxanes obtainable accordingly as defoamers, as wetting agents, and as additives in coating material formulations.

The application of liquid, polymer-based compositions (liquid systems), such as paints, printing inks and polymer-based liquid coating materials, for example, in thin layers on surfaces of solid substrates is often problematic if the liquid system has a high surface tension while the surface tension of the substrate is low.

Liquid systems generally comprise not only one or more polymeric resins but also one or more solvents or diluents and also, optionally, fillers, pigments and/or additives. Modern synthetic binder systems such as epoxy resins, 2K polyurethane systems, polyester resins, melamine resins, and radiation-curing binders have a composition and molecular structure which give them a comparatively high intrinsic surface tension in comparison to traditional binders based on oxidatively drying fatty acids or oils. As a consequence it is often more difficult to apply liquid systems based on synthetic binder systems of this kind to surfaces than it is to apply conventional coating materials based on alkyd resins or on comparable oxidatively drying oils or fatty acids.

Aqueous coating material compositions in particular have a high surface tension, naturally. To obtain a highly compact, uniformly smooth, esthetically appealing surface, flow controller systems must be added to such compositions. These flow control assistants act by reducing the surface tension of the composition to produce improved spreading of the composition on the surface of the substrate and better flow of the film of polymer that forms on curing, thus giving a smooth surface. On account of their property of promoting flow of the polymer film which forms on curing, these assistants reduce the formation of defects, known as craters, which are caused by externally acting impurities or by impurities on the surface of the substrate.

Further phenomena known to occur in liquid systems are foaming and foam stabilization. These properties too are associated with different interfacial tensions and occur in particular in aqueous systems such as aqueous coating material compositions. The polymers present in the liquid include air bubbles, and so there are problems when processing the liquid composition and when producing optically appealing coatings. The inclusion of air in the liquid is found to be disruptive particularly in spray applications.

In methods for surface modification as well, especially for the surface modification of hydrophobic substrates with aqueous mixtures of surface-reactive molecules, unwanted effects may occur that are attributable to differences in the interfacial tensions. Hence there is incomplete wetting of the hydrophobic substrate with the aqueous mixture, resulting in nonuniform coverage of the substrate with the surface-reactive molecules. To counteract this, wetting agents are added to the liquid reaction mixtures.

Numerous surface-active additives which counter the aforesaid problems are available commercially. These additives have, for example, an effect which promotes the flow, leveling, or spreading of the coating material, and they reduce the formation of defects, have defoaming and/or deaerating qualities, or can be used as wetting agents.

Known compounds used for the aforementioned purposes are organically modified polysiloxanes. Particularly important representatives of this class of compound are oligo- and polyalkylene ether-modified polysiloxanes. With these compounds it is comparatively easy to obtain surface-active polymers with different properties, through variation in length and composition of the hydrophilic polyalkylene ether chain on the hydrophobic polysiloxane framework, that can be used in different liquid systems. Accordingly, oligo- and polyalkylene ether-modified polysiloxanes are an industrially important class of compound, and extremely easy and economic access to these compounds is desirable.

There are various preparation processes described in the prior art for oligo- and polyalkylene ether-modified polysiloxanes. These processes predominantly involve hydrosilylations of the corresponding allyl ethers with H-polysiloxanes, or condensation reactions of H-polysiloxanes or chloropolysiloxanes with OH-functionalized oligo- or polyalkylene ethers. In other processes, alkoxy-functionalized polysiloxanes are reacted with OH-functionalized oligo- or polyalkylene ethers in the form of a transalkoxylation reaction, also referred to as transesterification. In the transalkoxylation, an alkoxy group bonded to a silicon atom is replaced by another alkoxy group, in the presence of a catalyst. The transalkoxylation is described in the review article by H. Steimann et al., Z. Chem. 1977, 17, 3, 89-92, for example.

EP 1739132 A2 describes the preparation of linear organopolysiloxane-polyoxyalkylene copolymers in which polyoxyalkylene groups are bonded to the terminal silicon atoms of the organopolysiloxane via propane-1,3-diyl bridges. The copolymers are prepared by platinum-catalyzed hydrosilylation of allyl compounds.

U.S. Pat. No. 3,133,111 describes a process for the transesterification of organosilicon compounds containing alkoxy groups, an example being the reaction of alkoxy-functionalized organosiloxanes with OH-functionalized polyoxyalkylenes. As transesterification catalysts, combinations of organic acids with bases are described.

EP 0542484 A1 describes a process for preparing organosilicon compounds, polysiloxanes for example, which carry terminal unsaturated groups. One possibility given for preparing these compounds is the reaction of an alkoxy function bonded on the silicon atom with an unsaturated alkanoyl in a transesterification reaction. Various transesterification catalysts are mentioned; the transesterification catalyst used in the examples is tetraisopropyl titanate.

The processes of the prior art are associated with disadvantages. The preparation of the starting materials, particularly of the allyl ethers, is inconvenient and expensive. The reaction of chlorosiloxanes with OH-terminated oligo- or polyalkylene ethers leads to the formation of unwanted salts. In the condensation of H-polysiloxanes with OH-terminated oligo- or polyalkylene ethers, there is unwanted release of hydrogen gas. The space-time yields in the preparation of oligo- or polyalkylene ether-modified polysiloxanes by transalkoxylation reaction are unsatisfactory.

It is an object of the invention, therefore, to provide a process for preparing oligo- or polyalkylene ether-functionalized polysiloxanes that allows these compounds to be prepared simply and economically, without the disadvantages described above. The polysiloxanes ought to be suitable in particular as additives for polymer-based liquid systems, especially liquid systems based on synthetic binder systems, examples being physically drying aqueous binder systems such as polymer latices, but also for thermally curable binder systems such as epoxy resins, 2K polyurethane systems, polyester resins, and melamine resins, and also for radiation-curing binders.

It has been found, surprisingly, that the transalkoxylation reaction on the silicon atom proceeds at a fast rate in the presence of a tetra-$C_1$-$C_6$-alkoxytitanate.

The object on which the invention is based is achieved by a process for preparing oligo- or polyalkylene ether-modified polysiloxanes wherein an alkoxy-functionalized polysiloxane is reacted with an OH-functionalized oligo- or polyalkylene ether in the presence of a tetra-$C_1$-$C_6$-alkoxytitanate.

Accordingly the present invention relates to a process for preparing polysiloxanes (1) having at least one oligo- or polyalkylene ether group, comprising reacting a polysiloxane (2) having at least one $C_1$-$C_6$ alkoxy group bonded to a silicon atom of the polysiloxane (2) with an OH-terminated oligo- or polyalkylene ether (3) in the presence of a catalyst, the catalyst being a tetra-$C_1$-$C_6$-alkoxytitanate.

The present invention also relates to the use of polydimethylsiloxanes (1) obtainable by the process of the invention as defoamers, wetting agents, and additives, especially as flow control assistants, in coating material formulations.

The process of the invention uses a polysiloxane (2) which has at least one $C_1$-$C_6$ alkoxy group bonded to a silicon atom of the polysiloxane (2). The polysiloxane (2) preferably has on average 1 to 6, more particularly 1 to 4, and especially 1 or 2 $C_1$-$C_6$ alkoxy groups bonded to in each case one silicon atom of the polysiloxane (2).

Here and below, alkyl is a saturated, linear, or branched hydrocarbon radical having for example 1 to 20 or 1 to 6 or 1 to 4 C atoms. Examples of alkyl are methyl, ethyl, n-propyl, isopropyl, n-butyl, 2-butyl, isobutyl, tert-butyl, n-pentyl, 2-methylbutyl, 3-methylbutyl, 1,2-dimethylpropyl, 1,1-dimethylpropyl, 2,2-dimethylpropyl, 1-ethyl-propyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, 2-ethylhexyl, nonyl, decyl, undecyl, dodecyl, tridecyl, tetradecyl, hexadecyl, octadecyl, and eicosyl, including the isomers of the aforesaid groups.

Alkoxy is a saturated, linear, or branched alkyl radical bonded via an oxygen atom and having for example 1 to 6 or 1 to 4 C atoms. Examples of alkoxy are methoxy, ethoxy, n-propoxy, isopropoxy, n-butoxy, 2-butoxy, isobutoxy, tert-butoxy, n-pentoxy, and n-hexoxy, including the isomers of the two last-mentioned groups.

The at least one $C_1$-$C_6$ alkoxy group bonded to a silicon atom of the polysiloxane (2) is preferably selected from $C_1$-$C_4$ alkoxy groups, more particularly linear $C_1$-$C_4$ alkoxy groups, and especially from methoxy and ethoxy.

If more than one $C_1$-$C_6$ alkoxy group is bonded to the polysiloxane (2), the $C_1$-$C_6$ alkoxy groups are preferably bonded to in each case different silicon atoms of the polysiloxane (2).

One preferred embodiment of the process of the invention uses a polysiloxane (2) which is linear and carries in each case a $C_1$-$C_6$ alkoxy group, more particularly in each case a linear $C_1$-$C_4$ alkoxy group, and especially a methoxy group or an ethoxy group, on at least one of the two terminal silicon atoms. In this embodiment, preferably both terminal silicon atoms each carry one $C_1$-$C_6$ alkoxy group, more particularly each one linear $C_1$-$C_4$ alkoxy group, and especially a methoxy group or an ethoxy group.

With preference in the process of the invention a polysiloxane (2) is used which has on average 5 to 30 silicon atoms, more particularly 6 to 20 silicon atoms.

The polysiloxane (2) is preferably a polydi-$C_1$-$C_{20}$ alkylsiloxane, more preferably a polydi-$C_1$-$C_6$ alkylsiloxane. Very preferably the polysiloxane (2) is a polydimethylsiloxane.

With particular preference a polysiloxane (2) of the formula (2a) below is used in the process of the invention,

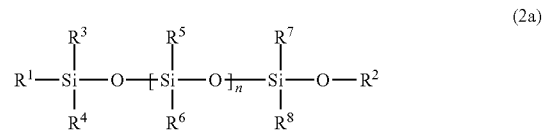

(2a)

in which $R^1$ and $R^2$ independently of one another are $C_1$-$C_6$ alkoxy, more particularly linear $C_1$-$C_4$ alkoxy and especially methoxy or ethoxy, a linear or branched alkyl group having 1 to 20 carbon atoms, a linear or branched, mono- or polyunsaturated alkenyl group having 2 to 20 carbon atoms, or a phenyl radical, and at least one of the radicals $R^1$ and $R^2$ is $C_1$-$C_6$ alkoxy, $R^3$, $R^4$, $R^5$, $R^6$, $R^7$, and $R^8$ independently of one another are a linear or branched alkyl group having 1 to 20, more particularly 1 to 10 or 1 to 4, carbon atoms, a linear or branched, mono- or polyunsaturated alkenyl group having 2 to 20, 2 to 6, or 2 to 4 carbon atoms, or a phenyl radical, and n is a number between 3 and 28, preferably between 3 and 16.

Preferred polysiloxanes of the formula (2a) are those in which $R^3$, $R^4$, $R^5$, $R^6$, $R^7$, and $R^8$ are each a linear or branched alkyl group having 1 to 4 carbon atoms, more particularly methyl, and $R^1$ and $R^2$ are each $C_1$-$C_6$ alkoxy, more particularly linear $C_1$-$C_4$ alkoxy, and especially methoxy or ethoxy.

Cycloalkyl is a saturated, cyclic hydrocarbon radical having for example 3 to 10 or 3 to 6 C atoms. Examples of cycloalkyl are cyclopropyl, cyclobutyl, cyclopentyl, and cyclohexyl.

Alkenyl is an unsaturated, linear or branched hydrocarbon radical having for example one, two, or three carbon-carbon double bonds, and having for example 2 to 20 C atoms or 2 to 6 C atoms. Examples of alkenyl are vinyl, allyl, isopropenyl, butenyl, n-pentenyl, and isoprenyl.

Alkynyl is an unsaturated, linear or branched hydrocarbon radical having for example one, two, or three carbon-carbon triple bonds, and having for example 2 to 20 C atoms or 2 to 6 C atoms. Examples of alkynyl are ethynyl, propargyl, and butynyl.

Alkylene and alkanediyl denote a linear or branched, saturated divalent hydrocarbon radical having for example 1 to 10 C atoms and more particularly 2 to 4 C atoms, such as methylene, 1,2-ethanediyl, 1,2-propanediyl, 1,3-propanediyl, 1,2-butanediyl, 1,3-butanediyl, 1,4-butanediyl, 2-methyl-1,2-propanediyl, 1,6-hexanediyl, 1,7-heptanediyl, 1,9-nonanediyl, and 1,10-decanediyl, for example.

The polysiloxanes (2) are provided preferably through reaction of cyclic or linear oligo- and/or polysiloxanes, preferably oligo- and/or polydimethylsiloxanes, with $C_1$-$C_6$ alkoxysilanes. The equilibration takes place typically with acid catalysis. Acids preferred for the equilibration are organic sulfonic acids, more particularly aromatic sulfonic acids such as p-toluenesulfonic acid, for example, and alkanesulfonic acids, more preferably halogenated alkanesulfonic acids such as trifluoromethanesulfonic acid, for example. Acids further preferred for the equilibration are acidic ion exchange resins, examples being those of the Lewatit® and Amberlyst® brands.

Examples of oligo- and/or polydimethylsiloxanes used in the preparation of the polysiloxanes (2) are linear or, in particular, cyclic polysiloxanes having 2 to 6 silicon atoms, examples being octamethylcyclotetrasiloxane, decamethylcyclopentasiloxane, and mixtures thereof.

The $C_1$-$C_6$ alkoxysilanes are preferably compounds of the formula $(R^9O)_m R^{10}_{4-m}Si$, in which $R^9$ is $C_1$-$C_6$ alkyl, $R^{10}$ is $C_1$-$C_6$ alkyl, $C_3$-$C_6$ cycloalkyl, phenyl, $C_2$-$C_6$ alkenyl, or $C_2$-$C_6$ alkynyl, and m is 1, 2, 3, or 4. Particularly preferred is the use of a $C_1$-$C_6$ alkoxysilane of formula $(R^9O)_2 R^{10}_2 Si$. $R^9$ is preferably $C_1$-$C_4$ alkyl, more particularly linear $C_1$-$C_4$ alkyl, and especially methyl or ethyl. $R^{10}$ is preferably $C_1$-$C_6$ alkyl, more particularly methyl. Examples of $C_1$-$C_6$ alkoxysilanes are $C_1$-$C_6$ alkoxy-tri-$C_1$-$C_6$-alkylsilanes and $C_1$-$C_6$ alkoxy-di-$C_1$-$C_6$ alkyl-$C_2$-$C_6$ alkenyl silanes such as methoxy-trimethylsilane, ethoxytrimethylsilane, n-propoxytrimethylsilane, methoxydimethylethyl-silane, ethoxydimethylethylsilane, n-propoxydimethylethylsilane, methoxydimethylvinyl-silane, ethoxydimethylvinylsilane, n-propoxydimethylvinylsilane, di-$C_1$-$C_6$ alkoxy-di-$C_1$-$C_6$ alkylsilanes such as dimethyldimethoxysilane, diethyldimethoxysilane, dimethyldiethoxysilane, diethyldiethoxysilane, tri-$C_1$-$C_6$ alkoxy-$C_1$-$C_6$ alkylsilanes such as trimethoxymethylsilane and triethoxymethylsilane, and also tetra-$C_1$-$C_6$ alkoxysilanes such as tetramethoxysilane and tetraethoxysilane, and mixtures thereof.

The amount of the acid used for the equilibration is generally selected such that the concentration of the acid in the reaction mixture is in the range from 0.1 to 5 g/kg, more particularly in the range from 0.5 to 1 g/kg.

The equilibration may be carried out in an inert organic solvent, an example being an aromatic hydrocarbon. More particularly the equilibration takes place in bulk.

The temperatures required for the equilibration are situated generally in the range from 20 to 120° C. The duration of the reaction is dependent of course on the reactivity and the reaction temperature, and can be determined by means of routine experiments. Typically the equilibration is carried out until the ratio of the reactants and reaction products is in an equilibrium. The progress of the reaction, including the establishment of equilibrium, can be determined by measurement of specific parameters, e.g., viscosity, solids content, etc., by standard methods.

In the process of the invention, the polysiloxane (2) is reacted with an OH-terminated oligo or polyalkylene ether (3). The oligo- and polyalkylene ethers (3) used in the process of the invention have a linear structure with two ends. The oligo- or polyalkylene ether (3) is terminated at one end or at both ends, in each case with an OH group. The oligo- or polyalkylene ether is preferably terminated only at one of the two ends with an OH group.

One preferred embodiment of the process of the invention uses an oligo- or polyalkylene ether (3) which is terminated only at one of the two ends with a OH group. Preferred oligo- and polyalkylene ethers (3) of this embodiment are those of the formula (3a)

  (3a)

in which
A is $C_2$-$C_4$ alkane-1,2-diyl,
k is a number in the range from 2 to 100, R is a monovalent hydrocarbon radical having 1 to 20 C atoms, more particularly $C_1$-$C_{20}$ alkyl, $C_2$-$C_{20}$ alkenyl, or $C_2$-$C_{20}$ alkynyl.

In the above-identified formula (3a) the moieties A can be selected to be identical or different, e.g. a compound of formula (3a) can contain O2 alkane-1,2-diyl and $C_3$ alkane-1,2-diyl.

In an alternative embodiment, preferred oligo- and polyalkylene ethers (3) of this embodiment are those of the formula (3b)

  (3a)

in which
E is $C_2$ alkane-1,2-diyl,
P is $C_3$ alkane-1,2-diyl,
r is a number in the range of 0 to 100,
s is a number in the range of 0 to 100,
(r+s) is a number in the range from 2 to 100,
R is a monovalent hydrocarbon radical having 1 to 20 C atoms, more particularly $C_1$-$C_{20}$ alkyl, $C_2$-$C_{20}$ alkenyl, or $C_2$-$C_{20}$ alkynyl.

Preferred oligo- and polyalkylene ethers (3) are composed of $C_1$-$C_6$ alkanediyloxy units, more particularly $C_2$-$C_4$ alkanediyloxy units. With particular preference the oligo- and polyalkylene ethers (3) are composed of $C_2$-$C_4$ alkane-1,2-diyloxy units, very preferably ethane-1,2-diyloxy and/or propane-1,2-diyloxy units.

Preferred oligo- and polyalkylene ethers (3) are oligo- and polyethylene glycols, oligo- and polypropylene glycols, and oligo- and polyalkylene glycols having ethylene glycol and propylene glycol units. Particularly preferred are oligo- and polyethylene glycols, oligo- and polypropylene glycols, and oligo- and polyalkylene glycols having ethylene glycol and propylene glycol units that are functionalized on one of the two ends with a monovalent hydrocarbon radical having 1 to 20 C atoms, more particularly with $C_1$-$C_{20}$ alkyl, $C_2$-$C_{20}$ alkenyl, or $C_2$-$C_{20}$ alkynyl. Examples of particularly preferred oligo- and polyalkylene ethers (3) are selected from n-butyl diethylene glycol, methyltripropylene glycol, n-butylpolypropylene glycol, methylpolyethylene glycol, n-butylpolypropylene glycol, allylpolyethylene glycol, allylpolypropylene glycol, allylpolyethers having ethylene glycol and propylene glycol units, and mixtures thereof.

The OH-terminated oligo- and polyalkylene ethers (3) used in the process of the invention preferably have a weight-average molecular weight in the range from 100 to 3000 g/mol, more preferably in the range from 150 to 2000 g/mol.

The proportion in which the OH-terminated oligo- or polyalkylene ethers (3) and the polysiloxane (2) are used is preferably such that the molar ratio of OH groups in the oligo- or polyalkylene ether (3) to the $C_1$-$C_6$ alkoxy groups in the polysiloxane (2) is in the range from 0.5:1 to 3:1, more particularly in the range from 0.8:1 to 2:1.

In one preferred embodiment the process of the invention is carried out without the addition of a solvent, in bulk.

In one further preferred embodiment the process of the invention is carried out in an organic solvent. Preferred organic solvents are aprotic organic solvents, which are preferably selected from aromatic hydrocarbons such as toluene, xylenes, and mixtures thereof, for example.

In the process of the invention a tetra-$C_1$-$C_6$-alkoxytitanate is used as catalyst. Preference is given to tetramethoxytitanate, tetraethoxytitanate, tetra-n-propoxytitanate, tetraisopropoxytitanate and tetra-n-butoxytitanate. Particular preference is given to tetra-n-butoxytitanate.

The amount of the tetra-$C_1$-$C_6$-alkoxytitanate used is frequently 0.01 to 3 wt %, more particularly 0.05 to 1 wt %, based on the total weight of the reaction mixture.

The process of the invention is carried out frequently at a reaction temperature in the range from 100 to 200° C., more particularly in the range from 120 to 180° C.

The process of the invention is carried out more particularly such that the $C_1$-$C_6$ alkanol which forms in the reaction of the polysiloxane (2) with the oligo- or polyalkylene ether (3) is removed at least partially during the reaction, by distillation, from the reaction mixture.

The reaction of the polysiloxane (2) with the oligo- or polyalkylene ether (3) in the presence of the tetra-$C_1$-$C_6$-alkoxytitanate catalyst can be carried out in the reaction vessels of the kind known in principle from the prior art. These are, for example, reactors such as stirred tanks, particularly those with close-clearance stirrers, including stirred tank cascades, and also tubular reactors, which may optionally have dynamic and/or static mixing elements. The reactors generally have one or more devices for supplying the reactants and devices for withdrawing the products, and also, optionally, means for the supply and for the removal of the heat of reaction, and also, optionally, means for the control and/or monitoring of the reaction parameters of pressure, temperature, conversion, etc. The reactors may be operated batchwise or continuously.

The oligo- and polyalkylene ether-modified polysiloxanes (1) obtainable by the process of the invention have advantageous qualities as flow control assistants, defoamers, and deaerating agents. They are advantageously suitable as additives for polymer-based liquid systems, especially liquid systems based on synthetic binder systems, examples being physically drying aqueous binder systems such as polymer latices, though also for thermally curable binder systems such as epoxy resins, 2K polyurethane systems, polyester resins, and melamine resins, and also for radiation-curing binders.

In coating material formulations, the polysiloxanes (1), especially linear polydimethylsiloxanes (1), act as additives which promote the uniform spreading of the coating composition over the substrate surface to be coated, and therefore lead to coatings that are smoother than with unadditized coating material formulations. Moreover, coating material formulations which comprise the polysiloxanes (1), especially linear polydimethylsiloxanes (1), give the coatings produced from them an improved dirt repellency effect, especially a hydrophobizing effect. The polysiloxanes (1), especially linear polydimethylsiloxanes (1), are therefore suitable for reducing the dirt pickup tendency of coatings, and also as hydrophobizing antigraffiti additives.

The polysiloxanes (1) are advantageously suitable, moreover, as wetting agents, especially in liquid compositions used in methods of surface modification. The polysiloxanes (1) are especially suitable as wetting agents in aqueous compositions which are used for the surface modification of hydrophobic substrates.

Another subject of the present invention, therefore, is the use of linear polydimethylsiloxanes (1) which carry a group of the formula (3b) on each of the two terminal silicon atoms:

(3b)

in which A is $C_2$-$C_4$ alkane-1,2-diyl, k is a number in the range from 2 to 100, and R is a monovalent hydrocarbon radical having 1 to 20 C atoms, more particularly $C_1$-$C_{20}$ alkyl, $C_2$-$C_{20}$ alkenyl, or $C_2$-$C_{20}$ alkynyl as defoamers, more particularly as defoamers in aqueous systems, as for example in aqueous coating material formulations or aqueous polymer dispersions.

Another subject of the present invention is the use of linear polydimethylsiloxanes (1), which carry a group of the formula (3b) on each of the two terminal silicon atoms as wetting agents, especially in processes for surface modification.

Another subject of the present invention is the use of linear polydimethylsiloxanes (1), which carry a group of the formula (3b) on each of the two terminal silicon atoms as additives in coating material formulations, especially aqueous coating material formulations which comprise at least one organic binder, and especially as defoamers and/or flow control assistants.

In a first embodiment of the invention the organic binder is a physically drying binder, more particularly an aqueous polymer latex as used in aqueous coating material systems such as masonry paints, interior paints, paints for cement-bound substrates such as concrete roofing shingles and fiber cement slabs, wood paints, and the like. The polymer latices may in principle be any of the polymer latices used for this purpose, examples being vinyl acetate, ethylene polymer latices, polystyrene latices, styrene-acrylate polymer latices, straight-acrylate latices, styrene-butadiene polymer latices, polyolefin latices, etc. Examples of corresponding coating materials and formulation recipes are found in M. Schwartz, R. Baumstark, Waterbased Acrylates for Decorative Coatings, Curt-Vincentz-Verlag, 2001.

In a further embodiment of the invention the organic binder is a binder which cures after application. Included here in particular are
 formulations which comprise as organic binder a thermosetting binder, such as, for example, epoxy formulations, e.g., mixtures of epoxy resins with aminic hardeners, epoxy-phenolic resin mixtures, and polyester-melamine-epoxy resin formulations, melamine resin formulations, e.g., alkyd-melamine resin formulations, polyester-melamine resin formulations, polyester-melamine resin formulations with isocyanate curing agents, and acrylate-melamine resin formulations, and also phenolic resin formulations,
 2K polyurethane formulations,
 2K epoxy formulations,
 radiation-curable compositions, and
 oxidatively curing formulations.

2K Polyurethane formulations are understood as formulations which comprise as binder at least one polyol component, examples being low molecular mass compounds having at least two hydroxyl groups, and also oligomeric or polymeric substances having on average at least two hydroxyl groups per molecule, such as a polyacrylate polyol, a polyether polyol, or a polyester polyol, for example, and at least one isocyanate curing agent, i.e., an oligomeric compound having on average at least two NCO groups per molecule, such as a biuret, allophanate, or cyanurate of the aforementioned diisocyanates, for example. These 2K formulations cure to form a polyurethane network.

2K Epoxy formulations are understood as formulations which comprise as binder at least one epoxy resin, as for example an epoxy resin based on a diglycidyl ether of bisphenol A, or based on a diglycidyl ether of ring-hydrogenated bisphenol A, and at least one aminic hardener, i.e., a low molecular mass or oligomeric compound having at least two primary and/or secondary amino groups.

Radiation-curable compositions are understood as formulations which comprise a binder based on photopolymerizable prepolymers that cure to a polymeric network on exposure to light or actinic radiation. The photopolymerizable prepolymers include, in particular, oligomers which have on average at least two ethylenically unsaturated groups, more particularly acrylate, methacrylate, or allyl groups, examples being urethane acrylates, polyether acrylates, and polyester acrylates.

Oxidatively curing formulations are understood as formulations which comprise as binder an oligomeric substance which cures to a solid polymer film on exposure to oxygen. Examples of such substances are unsaturated fatty acids and esters of unsaturated fatty acids, as for example alkyd resins based on unsaturated fatty acids.

The linear polydimethylsiloxanes (1) are customarily used in an amount such that the total amount of polydimethylsiloxane (1) in the coating material formulation is in the range from 0.01 to 5 wt %, more particularly in the range from 0.1 to 3 wt %, and especially in the range from 0.2 to 2 wt %, based on the total weight of the coating material formulation.

As well as the binder and the polydimethylsiloxanes (1) of the invention, the coating material formulations may comprise one or more constituents of the kind customarily present in coating material formulations. The nature of these additional constituents is dependent, in a manner known per se, on the desired end application and on the particular binder system.

The further constituents include, in particular, colorants, such as dyes and pigments, fillers, liquid solvents and diluents, including those known as reactive diluents, and also conventional additives.

Suitable colorants are, in particular, organic and inorganic pigments. Examples of organic pigments are color pigments and nacreous pigments such as azo, disazo, naphthol, benzimidazolone, azo condensation, metal complex, isoindolinone, quino-phthalone, and dioxazine pigments, polycyclic pigments such as indigo, thioindigo, quinacridones, phthalocyanines, perylenes, perinones, anthraquinones, e.g., aminoan-thraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Further examples of organic pigments can be taken from the following monograph: W. Herbst, K. Hunger "Indus-trielle Organische Pigmente", $2^{nd}$ edition, 1995, VCH Verlagsgesellschaft, ISBN: 3-527-28744-2. Examples of inorganic pigments are metallic flakes such as aluminum, and also aluminum oxide, iron(III) oxide, chromium(III) oxide, titanium(IV) oxide, zirconium(IV) oxide, zinc oxide, zinc sulfide, zinc phosphate, mixed metal oxide phosphates, molybdenum sulfide, cadmium sulfide, graphite, vanadates such as bismuth vanadate, chromates such as lead(IV) chromates, molybdates such as lead(IV) molybdate, and mixtures thereof.

Examples of suitable fillers are inorganic or organic particulate materials such as, for example, calcium carbonates and silicates, and also inorganic fiber materials such as glass fibers, for example. Organic fillers such as carbon fibers, and mixtures of organic and inorganic fillers such as, for example, mixtures of glass fibers and carbon fibers, or mixtures of carbon fibers and inorganic fillers, may also be employed. The fillers can be added in an amount of 1 to 75 wt %, based on the total weight of the composition.

Particular examples of solvents are organic solvents, selected for example from the solvents L.1, L.2, L.3, L.4, L.5, and L.6 listed below:

L.1 aliphatic and cycloaliphatic alcohols such as methanol, ethanol, ethylene glycol, diethylene glycol, propylene glycol, ethylene glycol monomethyl ether, ethylene glycol monoethyl ether, and ethylene glycol monobutyl ether, L.2 alkyl esters of aliphatic monocarboxylic and dicarboxylic acids such as ethyl, propyl, butyl, or hexyl acetate, ethylene glycol monomethyl ether acetate, ethylene glycol monoethyl ether acetate, and ethylene glycol monobutyl ether acetate, L.3 aliphatic and alicyclic ethers such as diethyl ether, dibutyl ether, methyl tert-butyl ether, ethyl tert-butyl ether, ethylene glycol dimethyl ether, ethylene glycol diethyl ether, tetrahydrofuran, and dioxane, L.4 aliphatic and alicyclic ketones such as acetone, methyl ethyl ketone, and cyclo-hexanone, L.5 N,N-dialkyl amides of aliphatic carboxylic acids and N-alkyllactams such as N,N-dimethylformamide, N,N-dimethylacetamide, and N-methylpyrrolidone, L.6 aromatic organic solvents such as benzene, toluene, or xylenes, and also mixtures of the aforesaid organic solvents, and also aliphatic and cycloaliphatic hydrocarbons and hydrocarbon mixtures.

Examples of reactive diluents are, in particular, monoethylenically unsaturated monomers, especially alkyl, and cycloalkyl esters of acrylic acid or of methacrylic acid, and also heterocyclic acrylates and methacrylates such as tetrahydrofurfuryl (meth)acrylate and 1,3-dioxolan-4-ylmethyl (meth)acrylate, but also di- or poly-ethylenically unsaturated monomers such as alkylene glycol diacrylates and dimethacrylates, e.g., 1,4-butanediol di(meth)acrylate and 1,6-hexanediol di(meth)-acrylate, oligoalkylene glycol diacrylates and dimethacrylates such as diethylene glycol di(meth)acrylate, triethylene glycol di(meth)acrylate, and dipropylene glycol di(meth)-acrylate, and pentaerythritol di- and tri(meth)acrylate.

Suitable conventional additives further comprise, for example, antioxidants, UV absorber/light stabilizers, metal deactivators, antistats, reinforcing agents, fillers, antifogging agents, propellants, biocides, plasticizers, lubricants, emulsifiers, rheological agents, catalysts, photoinitiators, adhesion regulators, optical brighteners, flame retardants, antidrip agents, and nucleating agents, and also mixtures thereof.

The light stabilizers/UV absorbers, antioxidants and metal deactivators optionally used preferably have a high migration stability and temperature resistance. They are selected, for example, from groups a) to t). The compounds of groups a) to g) and i) represent light stabilizers/UV absorbers, whereas compounds j) to t) act as stabilizers.

a) 4,4-diarylbutadienes,
b) cinnamic esters,
c) benzotriazoles,
d) hydroxybenzophenones,
e) diphenyl cyanacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds, s) polyamide stabilizers, and
t) basic costabilizers.

The choice of suitable conventional additives for the coating material formulations is dependent on the particular end use of the coating material formulation, and can be determined in each individual case by the skilled person.

Application of the coating material formulation for the purpose of producing a coating on a substrate may be accomplished by all customary application techniques such as spraying, knifecoating, spreading, pouring, dipping, or rolling, for example. Preference is given to employing spray application techniques such as, for example, compressed air spraying, airless spraying, high-speed rotation, electrostatic spray application (ESTA), optionally in conjunction with hot spray application such as hot air spraying, for example. Application may be carried out at temperatures of max. 70 to 80° C., such that suitable application viscosities are reached without alteration or damage to the coating material and to its overspray, intended optionally for reprocessing, under the brief thermal loading to which it is exposed. For instance, hot spraying may be configured in such a way that the coating material is heated only very briefly in the spray nozzle or shortly before the spray nozzle.

The spray booth used for the application may be operated, for example, with an optionally thermally regularable circulation, which is operated with a suitable absorption medium for the overspray, an example being the coating material itself.

The application techniques described above can of course also be employed in the production of further coating films or of the basecoat film as part of the production of a multicoat system. In this case it is possible to use different coating materials for constructing each of the various coats. Application to a basecoat film is preferred.

Substrates contemplated span a multiplicity of materials, both primed and unprimed. These are, for example, metals, plastics, wood, ceramic, stone, textile, fiber composites, leather, glass, glass fibers, glass wool and rock wool, mineral-bound and resin-bound building materials such as plasterboards and cement slabs, or roofing shingles.

The invention is elucidated in more detail by the examples hereinafter.

EXAMPLES

Analysis
Determination of Dynamic Coefficient of Friction

The dynamic coefficient of friction (COF) is determined using a COF tester from RAY-RAN Test Equipment Ltd by the "Pull-Meter" method (ASTM C-1028-96).

Determination of Gloss and Haze

Gloss and haze were determined using a "micro-Tri-gloss" from BYK-Gardner.

Gel Permeation Chromatography (GPC)

The gel permeation chromatography was carried out using a "1260 Infinity" from Agilent. Two ResiPore columns (300×7.5 mm; 3 μm) were used. The eluent employed was tetrahydrofuran (1 mL/minute) at an oven temperature of 40° C. Detection took place using an RI detector.

$^1$H-NMR Spectroscopy

The $^1$H-NMR spectra were recorded in $CDCl_3$ using a 400 MHz NMR spectrometer from Bruker.

Materials Used
Octamethylcyclotetrasiloxane (97%, ABCR)
Dimethyldiethoxysilane (97%, ABCR)
Trifluoromethanesulfonic acid (98%, Sigma-Aldrich)
Tri-n-butylamine (>98.5%, Sigma-Aldrich)
Xylene (96%, Sigma-Aldrich)
Clear PE Panels Form P 300-7C (PET sheet, LAU GmbH)

Preparation of the Alkoxy-Functionalized Siloxanes

Preparation of siloxane 1: $CH_3CH_2O-Si(CH_3)_2-O-(Si(CH_3)_2-O)_{12}-Si(CH_3)_2-OCH_2CH_3$ 3120 g Octamethylcyclotetrasiloxane, 694 g dimethyldiethoxysilane, and 2.5 g of trifluoromethanesulfonic acid were combined in a 5 L reactor and stirred at 60° C. for 6 hours. After the establishment of equilibrium, determined via the increase in the solids fraction of the mixture, the catalyst was neutralized by addition of 4 g of tri-n-butylamine. The reaction mixture was filtered and unreacted starting materials and low molecular mass oligomers formed as byproducts were removed by stripping under reduced pressure. The product obtained was analyzed by NMR spectroscopy. It comprised 3242 g of the siloxane 1.

Preparation of siloxane 2: $CH_3CH_2O-Si(CH_3)_2-O-(Si(CH_3)_2-O)_{22}-Si(CH_3)_2-OCH_2CH_3$ 2700 g Octamethylcyclotetrasiloxane, 300 g dimethyldiethoxysilane, and 2.5 g of trifluoromethanesulfonic acid were combined in a 5 L reactor and stirred at 60° C. for 6 hours. After the establishment of equilibrium, determined via the increase in the solids fraction of the mixture, the catalyst was neutralized by addition of 4 g of tri-n-butylamine. The reaction mixture was filtered and unreacted starting materials and low molecular mass oligomers formed as byproducts were removed by stripping under reduced pressure. The product obtained was analyzed by NMR spectroscopy. It comprised 2550 g of the siloxane 2.

Transalkoxylation of the Alkoxy-Functionalized Siloxanes

The quantities of siloxane, polyalkylene ether, xylene, and tetra-n-butoxytianate indicated in table 1 were mixed and the mixture was heated slowly to 160° with stirring. The reaction mixture was stirred for 8 hours at this temperature and at the same time ethanol and parts of the solvent were removed by distillation. The progress of the reaction was monitored by gel permeation chromatography. Following complete conversion, the solvent was removed under reduced pressure until the solids content was >98 wt %. The products obtained were used further without additional purification.

Polyalkylene ethers employed for the transalkoxylation were as follows (with weight-average molecular weights in parentheses):

Polyether 1: n-butyldiethylene glycol (162 g/mol)
Polyether 2: methyltripropylene glycol (222 g/mol)
Polyether 3: n-butylpolypropylene glycol (1350 g/mol)
Polyether 4: Methylpolyethylene glycol (350 g/mol)
Polyether 5: Methylpolyethylene glycol (500 g/mol)
Polyether 6: allyl polyether with ethylene glycol and propylene glycol units (554 g/mol)
Polyether 7: allyl polyether with ethylene glycol and propylene glycol units (950 g/mol)
Polyether 8: n-butylpolypropylene glycol (1200 g/mol)
Polyether 9: allylpolyethylene glycol (500 g/mol)
Polyether 10: allylpolypropylene glycol (975 g/mol)

TABLE 1

| Example | Siloxane | Polyalkylene ether | Solvent | Catalyst |
|---|---|---|---|---|
| 1 | 30 g Siloxane 1 | 15 g Polyether 1 | — | 0.3 g Tetra-n-butoxytitanate |
| 2 | 30 g Siloxane 1 | 19 g Polyether 2 | 20 g Xylene | 0.3 g Tetra-n-butoxytitanate |
| 3 | 10 g Siloxane 1 | 28 g Polyether 3 | 35 g Xylene | 0.2 g Tetra-n-butoxytitanate |
| 4 | 20 g Siloxane 1 | 13 g Polyether 4 | 30 g Xylene | 0.2 g Tetra-n-butoxytitanate |
| 5 | 20 g Siloxane 1 | 18 g Polyether 5 | 40 g Xylene | 0.2 g Tetra-n-butoxytitanate |
| 6 | 30 g Siloxane 1 | 29 g Polyether 6 | 40 g Xylene | 0.2 g Tetra-n-butoxytitanate |
| 7 | 20 g Siloxane 1 | 38 g Polyether 7 | 40 g Xylene | 0.2 g Tetra-n-butoxytitanate |
| 8 | 16 g Siloxane 2 | 20 g Polyether 8 | 50 g Xylene | 0.2 g Tetra-n-butoxytitanate |
| 9 | 25 g Siloxane 2 | 21 g Polyether 9 | 44 g Xylene | 0.2 g Tetra-n-butoxytitanate |
| 10 | 20 g Siloxane 2 | 17 g Polyether 10 | 50 g Xylene | 0.2 g Tetra-n-butoxytitanate |

Use Examples

Use as Flow Control Assistant

The test formulation used was a diluted Joncryl® 8052 dispersion (BASF SE) (9.24 g of water, 90.76 g of Joncryl® 8052). The amounts of the example compounds indicated in table 2 were incorporated into 25 g portions of the diluted Joncryl® 8052 dispersion using an electrical mixer at 2500 revolutions/minute over 2 minutes. The weight % indicated in table 2 are based on the total weight of the dispersion. The formulations were applied using a 60 µm doctor blade at a rate of 10 mm/s onto the PET sheet. The samples were dried for 24 hours and measurements were made of the dynamic coefficient of friction and of the gloss and haze. Surface structure and craters were rated visually on a scale from 1 to 8 (1=very good, 8=very poor). The reference used was the commercially available, polyether-modified polysiloxane Efka® SL-3299 (BASF SE).

TABLE 2

| Example | Polyethersiloxane | Dynamic coefficient of friction | Surface structure | Craters | Haze | Gloss |
|---|---|---|---|---|---|---|
| 11 (C) | — | 1.222 | 2 | 5 | 167 | 224 |
| 12 (C) | Efka ® SL-3299, 0.2 wt % | 1.173 | 1 | 1 | 103 | 232 |
| 13 (C) | Efka ® SL-3299, 0.5 wt % | 0.9347 | 2 | 1 | 97.3 | 232 |
| 14 (C) | Efka ® SL-3299, 1 wt % | 0.9166 | 3 | 8 | 100 | 232 |
| 15 | Example 9, 0.2 wt % | 0.5901 | 2 | 3 | 100 | 232 |
| 16 | Example 9, 0.5 wt % | 0.572 | 2 | 3 | 117 | 233 |
| 17 | Example 9, 1 wt % | 0.5499 | 1 | 3 | 103 | 233 |
| 18 | Example 4, 0.2 wt % | 0.6766 | 2 | 3 | 101 | 234 |
| 19 | Example 4, 0.5 wt % | 0.579 | 1 | 5 | 97.3 | 234 |
| 20 | Example 4, 1 wt % | 0.4562 | 2 | 6 | 97 | 233 |
| 21 | Example 5, 0.2 wt % | 0.6473 | 3 | 3 | 160 | 224 |
| 22 | Example 5, 0.5 wt % | 0.4492 | 2.5 | 2 | 168 | 223 |
| 23 | Example 5, 1 wt % | 0.3544 | 2 | 1 | 129 | 225 |
| 24 | Example 6, 0.2 wt % | 0.8957 | 2 | 2 | 100 | 235 |
| 25 | Example 6, 0.5 wt % | 0.8524 | 2 | 1 | 97 | 235 |
| 26 | Example 6, 1 wt % | 0.5078 | 2 | 2 | 91 | 236 |

(C): noninventive comparative example an electric mixer at 4500 revolutions/minute over 3 minutes. In all of the use examples, the concentration of the example compounds in the dispersions was 0.42 wt %, based on the total weight of the dispersion. Immediately after the example compound had been incorporated, a pycnometer (stainless steel, 100 cm$^3$) was used to determine the density of the formulation. The reference density of the fully deaerated, diluted Acronal® LR9014 dispersion was 1.101 g/cm$^3$.

For compatibility testing, the dispersions were applied with a film thickness of 100 µm, using a doctor blade, at a rate of 10 mm/s onto the PET sheet. The fully cured films were inspected.

For assessment of the storage stability, after 14-day storage at 45° C., the dispersions were stirred with an electric mixer at 4500 revolutions/minute for 3 minutes and their density was measured using the pycnometer.

Use as Defoamers

The test formulation used was a diluted Acronal® LR9014 dispersion (BASF SE) (35 g of water, 85 g of Acronal® LR9014). The example compounds indicated in table 3 were incorporated into the dispersion by stirring with The films were inspected on a scale from 1 to 4 (1=film satisfactory, no significant cratering or specks, 2=film satisfactory, slight unevenness, sporadic cratering or specks, 3=surface very uneven, massive cratering and specks, 4=no film formed, owing to incompatibility).

TABLE 3

| Example | Polyether-siloxane | Density in g/cm³, measured immediately | Compatibility after 1 day | Density in g/cm³, after 14 days | Compatibility after 14 days |
|---|---|---|---|---|---|
| 27 (C) | — | 0.648 | n.d. | 0.662 | n.d. |
| 28 (C) | Efka ® SI 2210 | 0.994 | 1.5 | 0.875 | 2.5 |
| 29 (C) | Efka ® SI 2550 | 1.101 | 3 | 1.057 | 3 |
| 30 | Example 2 | 1.099 | 1 | 1.042 | 1 |
| 31 | Example 8 | 0.991 | 1 | 1.047 | 1 |
| 32 | Example 10 | 1.021 | 1.5 | 1.036 | 1.5 |

(C): noninventive comparative example
n.d.: not determined

The invention claimed is:

1. A process for preparing at least one polysiloxane having at least one oligo- or polyalkylene ether group, the process comprising:

reacting a polysiloxane having at least one $C_1$-$C_6$ alkoxy group bonded to a silicon atom of the polysiloxane with an OH-terminated oligo- or polyalkylene ether of formula (3a) in the presence of a tetra-$C_1$-$C_6$ alkoxytitanate;

$$R\text{-}[O\text{-}A]_k\text{-}OH \quad (3a),$$

wherein A is $C_2$-$C_4$ alkane-1,2-diyl,
k is a number from 2 to 100, and
R is a monovalent hydrocarbon radical having 1 to 20 C atoms.

2. The process of claim 1,
wherein the OH-terminated oligo- or polyalkylene ether and the polysiloxane are reacted in a proportion such that a molar ratio of OH groups in the oligo- or polyalkylene ether to the at least one $C_1$-$C_6$ alkoxy group in the polysiloxane is from 0.8:1 to 2:1.

3. The process of claim 1,
wherein the reacting is carried out in an aprotic organic solvent.

4. The process of claim 1, the tetra-$C_1$-$C_6$ alkoxytitanate are used in an amount of 0.05 to 1 wt %, based on a total weight of a reaction mixture.

5. The process of claim 1,
wherein the tetra-$C_1$-$C_6$ alkoxytitanate is selected from the group consisting of tetramethoxytitanate, tetraethoxytitanate, tetra-n-propoxytitanate, tetraisopropoxytitanate and tetra-n-butoxytitanate.

6. The process of claim 1,
wherein a $C_1$-$C_6$ alkanol which forms during the reacting is at least partly removed during the reacting by distillation from a reaction mixture.

7. The process of claim 1,
wherein the polysiloxane has at least one element selected from the group of elements consisting of:
the polysiloxane comprises on average 5 to 30 silicon atoms,
the polysiloxane comprises 1 to 6 $C_1$-$C_6$ alkoxy groups bonded to in each case one silicon atom of the polysiloxane,
the polysiloxane is a linear polysiloxane which carries a $C_1$-$C_6$ alkoxy group on each of two terminal silicon atoms,
the polysiloxane is a polydimethylsiloxane, and
the at least one $C_1$-$C_6$ alkoxy group bonded to the silicon atom of the polysiloxane is selected from methoxy and ethoxy.

8. The process of claim 1,
wherein the polysiloxane reacted with the OH-terminated oligo- or polyalkylene ether of formula (3a) is obtained by reacting a linear or cyclic polysiloxane having 2 to 6 silicon atoms with a $C_1$-$C_6$ alkoxysilane of formula:

$$(R^9O)_m R^{10}{}_{4-m}Si$$
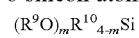

wherein $R^9$ is $C_1$-$C_6$ alkyl,
$R^{10}$ is $C_1$-$C_6$ alkyl, $C_3$-$C_6$ cycloalkyl, phenyl, $C_2$-$C_6$ alkenyl, or $C_2$-$C_6$ alkynyl, and
m is 1, 2, 3, or 4.

9. The process as claimed in claim 8,
wherein m is 2.

10. The process as claimed in claim 8,
wherein $R^9$ is methyl or ethyl and
$R^{10}$ is methyl.

* * * * *